United States Patent

[11] 3,571,638

[72] Inventor Tokuzo Inariba
Katamachi, Japan
[21] Appl. No. 4,704
[22] Filed Jan. 21, 1970
[45] Patented Mar. 23, 1971
[73] Assignee Kabushiki-Kaisha Tokai Rika Denki
Seisakusho
Nishi-Kasugai-gun, Japan
[32] Priority Jan. 31, 1969
[33] Japan
[31] 44-6662

[54] MINIATURE ELECTRIC SYNCHRONOUS MOTOR
3 Claims, 19 Drawing Figs.
[52] U.S. Cl............................................. 310/155,
310/164
[51] Int. Cl..................................................... H02k 21/38
[50] Field of Search........................................... 310/155,
162, 164, 168, 169

[56] References Cited
FOREIGN PATENTS
826,767 1/1952 Germany..................... 310/162

Primary Examiner—D. X. Sliney
Attorney—Shlesinger, Fitzsimmons & Shlesinger

ABSTRACT: A synchronous electric motor which comprises a pair of cylindrical permanent magnets fixedly mounted at a desired spacing with their opening ends facing each other within a motor casing, an annular AC exciting coil arranged coaxially around these permanent magnets, and a rotor interposed between said pair of cylindrical permanent magnets and having upper pole teeth and lower pole teeth extending vertically at desired spacings around the circumference of a flat disc plate to a center of which the rotor shaft is fitted, said upper and lower pole teeth of rotor lying within a magnetic airgap which is formed by said pair of cylindrical permanent magnets and exciting coil, hence the upper pole teeth and the lower pole teeth are caused to efficiently interlink with the direct magnetic flux and the alternating magnetic flux, thereby improving the self-starting efficiency and producing a torque more than twice that of conventional motors of the kind.

PATENTED MAR 23 1971 3,571,638

INVENTOR.
Tokuzo Inariba
BY
Shlesinger, Fitzsimmons & Shlesinger
Attorneys

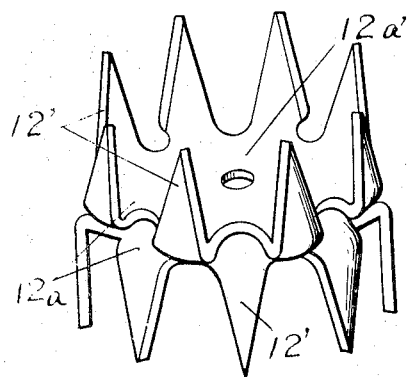
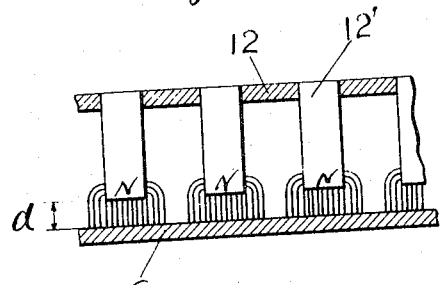
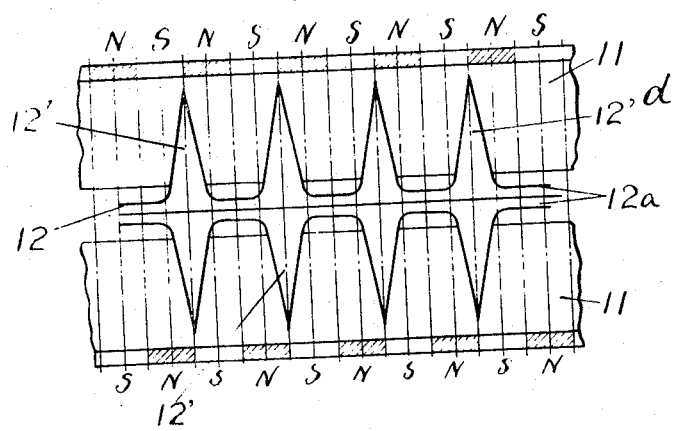
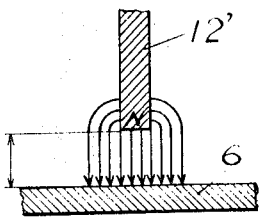
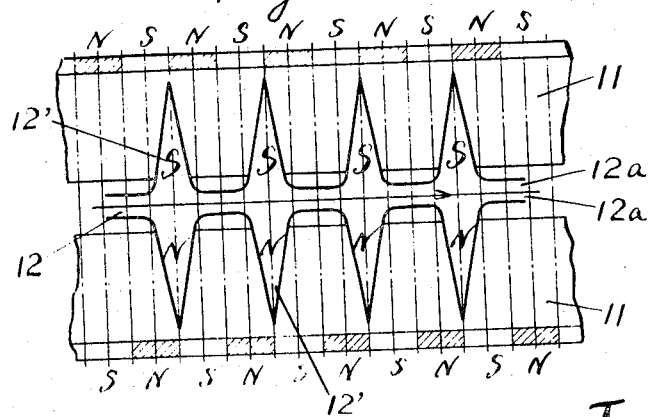
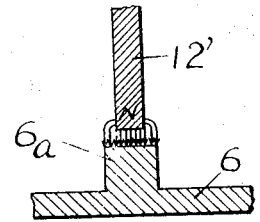
INVENTOR.
Tokuzo Inariba

MINIATURE ELECTRIC SYNCHRONOUS MOTOR

This invention relates to a miniature electric motor. Conventionally, many kinds of self-starting synchronous motors have been developed. These electric synchronous motors, however, can hardly start unless they are provided with a special staring mechanism, and unless they come up to synchronized velocity within half a cycle of the frequency of the supplied alternating current after being switched on. Therefore, it has been a major problem to obtain a high starting efficiency. These electric motors have, in common, disadvantages of small output torque, poor efficiency, high temperature rise, bulk and complicated structure.

These synchronous electric motors, wherein permanent magnets are commonly used as a rotor, have a serious drawback in respect of a starting efficiency, especially where they are of the compact type, because the permanent magnet serving as a rotor, which is made of a ferromagnetic substance, such as ferrite, results in a large mass and comparatively large moment of inertia.

The present invention made in view of the above disadvantages has as an object to provide a miniature synchronous electric motor which has a rotor so constructed that the magnetic force of the magnetic circuit efficiently acts thereupon, in other words, a useless magnetic gap is not formed, thereby greatly improving self-starting efficiency, hence a smooth rotation of motor is obtained.

Another object of the present invention is to provide a miniature synchronous electric motor wherein a torque is obtained more than twice that of a conventional motor such as disclosed in U.S. Pat. No. 3,348,083 issued to the present applicant, with the same ampere-turns of exciting coil; and the manufacture and assembling are quite simple and easy.

In the accompanying drawing showing a preferred embodiment of a miniature electric synchronous motor made in accordance with the present invention:

FIG. 4 is a perspective view of a rotor different in shape;

FIGS. 5a and 5b are explanatory developments showing the distribution of the magnetic poles of the rotor shown in FIG. 3 and a permanent magnet, in which FIG. 5a shows that an exciting coil remains unexcited, and FIG. 5b shows that the exciting coil is energized;

FIGS. 6a and 6b are explanatory developments showing the distribution of the magnetic poles of another shape of rotor shown in FIG. 4 and permanent magnet, in which FIG. 6a shows that the exciting coil remains unenergized and FIG. 6b shows that the exciting coil becomes energized;

FIGS. 7a, 7b, 8a, 8b, 9a, 9b, 10a and 10b are illustrations showing a variety of rotor components, the case b in each drawing being a diametral sectional view such as that in FIG. 7b which is taken along the line A-A of FIG. 7a.

FIG. 11 is an explanatory view showing the distribution of magnetic flux over a pole tooth of a salient pole ring of the rotor of a synchronous motor made according to the present invention;

FIG. 12a is an explanatory diagram showing the distribution of alternating magnetic flux around magnetic pole teeth of the conventional motor; and FIG. 12b is an explanatory diagram showing the distribution of alternating magnetic flux emanating from the pole tooth of a rotor of a conventional electric synchronous motor which is not provided with a salient pole ring.

Figure 1:
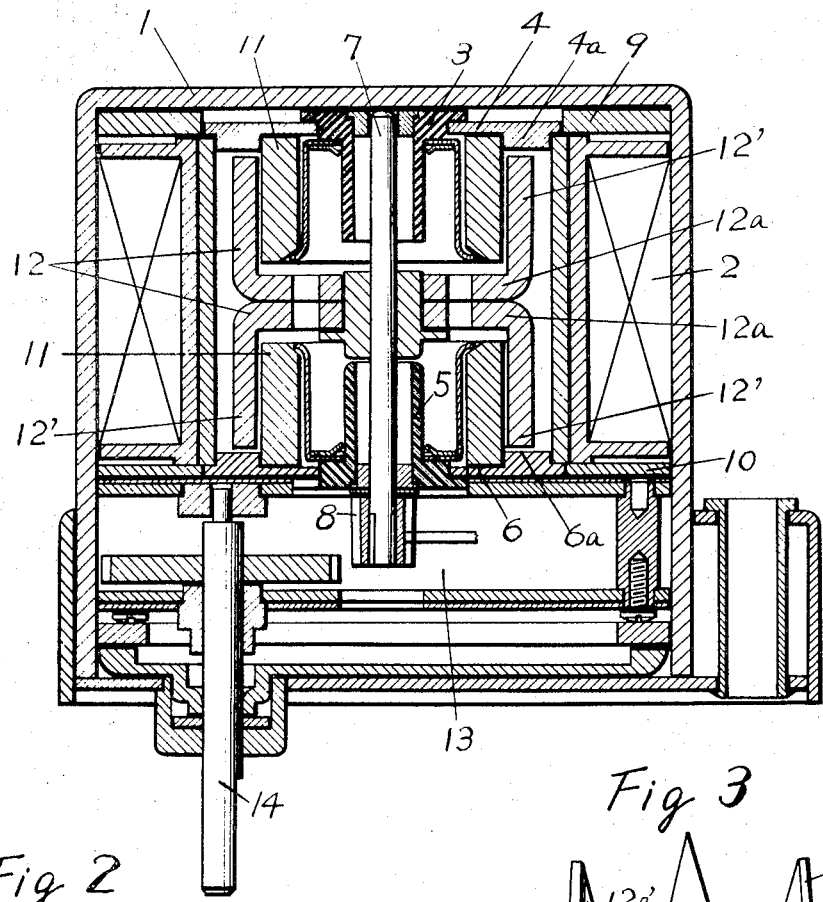
FIG. 1 is a longitudinal sectional view of a motor.

The preferred embodiment will be described in detail with reference to the accompanying drawing.

Numeral 1 indicates a cylindrical motor casing which is made of a soft magnetic material and serves as a part of an alternating magnetic circuit. Numeral 2 is an annular exciting coil fixed to the internal periphery of said motor casing 1, said exciting coil being supplied with an alternating current from the outside. Numeral 3 indicates a cylindrical bearing held centrally of an annular bottom base plate 4 so as to position it centrally of the motor casing 1. 5 is also a cylindrical bearing made of nonmagnetic material which is fixedly mounted on the central part of annular top base plate 6. The bearings 3 and 5 have a rotor shaft 7 rotatably mounted therethrough and having one end extending outwardly of the annular base 6. On said one end, an output pinion 8 is fixed.

These annular plates 4 and 6 are held at their outer peripheries by annular spacers 9 and 10, respectively, and provided with salient pole rings 4a and 6a confronting each other.

Numerals 11 and 11 denote a pair of cylindrical permanent magnets of the barium ferrite group and of similar construction which are fitted to the internal stepped portions of salient pole rings 4a and 6a and arranged at a desired spacing from each other, with their open ends facing.

Both of the cylindrical permanent magnets are the same in construction, and therefore, only one of them is explained in detail. Said permanent magnet 11 has 16 magnetic poles around its cylindrical periphery, these 16 magnetic poles alternating in polarity, with eight north poles alternating with eight south poles. The magnetic poles are spaced at equal angular distances around the cylindrical periphery of permanent magnet 11 and face toward the inner periphery of said exciting coil 2.

Numeral 12 is a rotor which is fixedly fitted to the rotor shaft 7 and interposed in the magnetic gap formed between said exciting coil 2 and permanent magnets 11 and 11.

Figure 3:
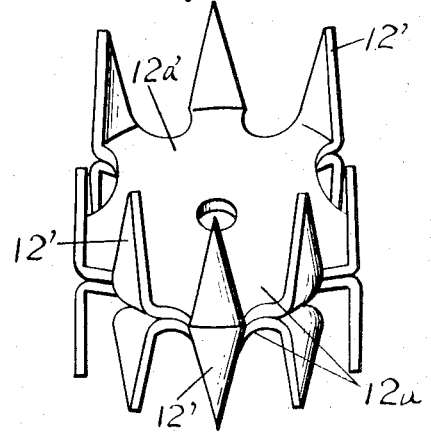
FIG. 3 is a perspective view of a rotor.

The rotor includes two rotor forming parts or components 12a joined at their flat disc portions 12a', 12a' in back to back relation, as best seen in FIG. 3. Each of said rotor components 12a has eight magnetic pole teeth 12', 12'..... arranged around its outer periphery at an equispacing, each of said magnetic pole teeth 12' being bent at its base to extend substantially perpendicularly with respect to the diametric plane of the disclike portion 12a and being triangular in shape, tapered toward its free end which is formed as a sharp-pointed end.

Furthermore, breaks or indentations 12'' are formed in the disclike portion 12a between the bases of adjacent pole teeth 12', 12'.

Because all of magnetic pole teeth 12', 12' are formed integrally with the rotor 12, all of magnetic pole teeth have the same instantaneous polarity when the exciting coil 2 is energized, this same instantaneous polarity changing from north to south and vice versa at a frequency equal to twice the frequency of AC potential which is applied to the exciting coil 2.

The rotor components 12a and 12a are joined at their disclike flat portions 12a' and 12a' in a way that magnetic pole teeth 12', 12' of respective components are in vertically aligned relation with their free ends extending in opposite directions as shown in FIG. 3, or alternately in vertically aligned relation with their free ends extending alternately in opposite directions as shown in FIG. 4. The rotor consisting of two associated components is assembled within the motor casing in such way that magnetic pole teeth 12', 12' of associated components extend in opposite directions in alignment with salient pole rings 4a and 6a formed on the annular base 4 and 6, with their sharp-pointed ends facing the rings.

The operation will be described hereinunder.

FIGS. 5a and 5b are explanatory diagrams showing magnetic poles on the sides of rotors shown in FIG. 3 and permanent magnets, FIG. 5a showing that the annular exciting coil 2 remains unexcited, while FIG. 5b shows that said annular exciting coil 2 becomes energized.

In detail, the stationary magnets 11 and 11, which are vertically arranged to face each other respectively have the circumferential south and north poles alternating in regular sequence at a predetermined spacing. The circumferential poles of the pair of permanent magnets are vertically opposite; the north pole of one permanent magnet on its circumference lying opposite to and above the south pole of the other permanent magnet 11. While the exciting coil 2 remains deenergized, no polarity is imparted to respective pole teeth 12', 12' of each rotor component 12a, 12a of the rotor 12.

As soon as the exciting coil 2 is energized, the alternating magnetic flux path extends from the exciting coil 2 into the rotor 12 through the salient pole ring 4a, the magnetic pole tooth 12' of one rotor component 12a, the magnetic pole tooth 12' of the other rotor component 12a, the salient pole ring 6a, the base plate 6, and back into the exciting coil 2. The flux at the gap between the sharp-pointed end of pole tooth 12' and the salient pole ring 6a is not diffused over the base plate 6 but concentrates into the salient pole ring 6a. The flux provided at the gap between the sharp-pointed end of pole tooth of one of the other rotor component and the salient pole ring 4a is the same as in the above.

In the pole arrangement shown in FIG. 5a, when the AC potential is applied to the exciting coil 2, all pole teeth assume the same instantaneous polarity so that the upper group of pole teeth are instantaneously magnetized into the south pole and the lower group of pole teeth are instantaneously magnetized to the north pole, and the upper group of pole teeth are magnetized to the north pole while the lower group of pole teeth to the south pole, synchronizing with the frequency of the alternating current. Consequently, when the pole teeth of the rotor are magnetized as shown in FIG. 5b, the upper pole teeth with the south poles are attracted by the north poles of the permanent magnet 11 positioned upwardly, while the lower pole teeth with the north poles are repelled by the north poles of permanent magnet 11, and attracted to the south poles thereof.

In the next half-cycle of alternating current, the instantaneous polarity of upper and lower pole teeth is reversed. Hence, the rotor 12 is caused to rotate in synchronism with the frequency of the alternating current source.

The rotational output is provided by the output shaft 14 through a gearing mechanism 13 including desired gear wheels in combination, as shown in FIG. 1.

In the rotor 11 described in the foregoing, two rotor components are arranged so as to position upper and lower pole teeth in vertical alignment with each other and extend them in opposite directions.

Alternatively, the upper component 12a and lower component 12a may be coupled so as to locate the upper pole teeth between the lower pole teeth, so that pole teeth of upper component and lower component are in the vertically alternating relation at a predetermined spacing, as shown in FIG. 4.

Figure 6A:
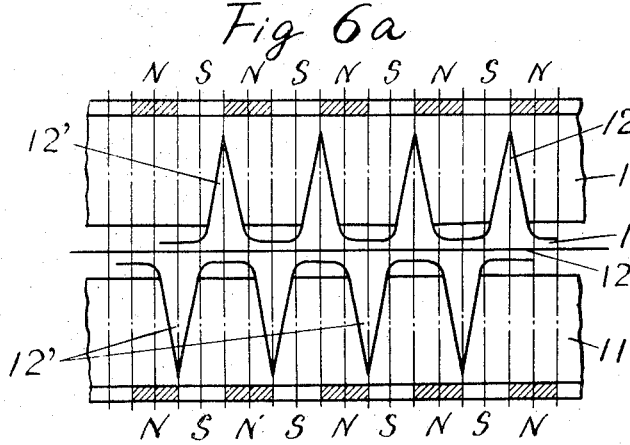

In using the rotor having vertically alternating pole teeth, the pair of permanent magnets 11 and 11 are so arranged as to have the same polarity at their opposite circumferences, which alternates the north pole with the south pole, which is similar to that of the former example as shown in FIG. 6a.

When the exciting coil 2 is energized to exert the magnetic influence upon the rotor 12, pole teeth 12' of upper component are instantaneously magnetized to the south poles while the lower pole teeth 12' are instantaneously magnetized to the north poles.

Consequently, the upper pole teeth assuming the south poles are attracted by the north poles of the upper permanent magnet 11, while the lower pole teeth assuming the north poles are attracted to the south poles of the lower permanent magnet 11.

In the next half cycle of alternating current, the instantaneous polarity of upper and lower pole teeth is reversed, so that the magnetic influences, repulsion and attraction, of the permanent magnets 11 and 11 similarly act upon these pole teeth. Thus, the rotor is caused to rotate in synchronism with the frequency of the AC source.

FIGS. 3 and 4 show examples of a rotor wherein upper and lower components 12a and 12a are united at their flat portion 12a' and 12a' into a unitary rotor, but there are other various rotors having pole teeth extending vertically in opposite directions to each other, some of which are shown in FIGS. 7 through 10.

Figure 7A:
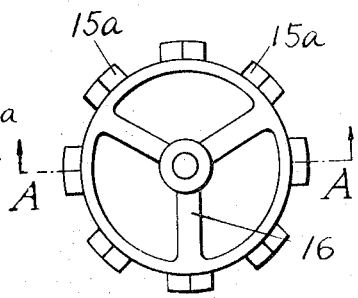
Figures 6B, 7B:
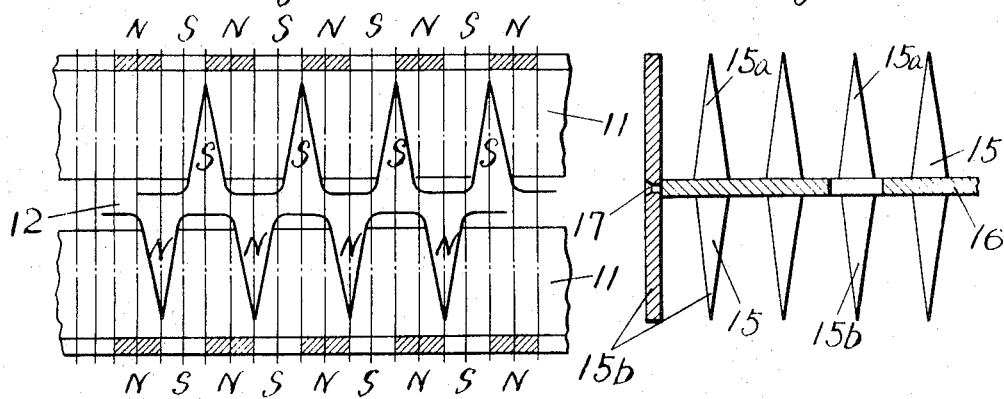
Figure 8A:
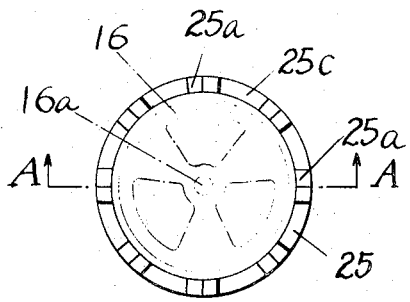
Figure 8B:
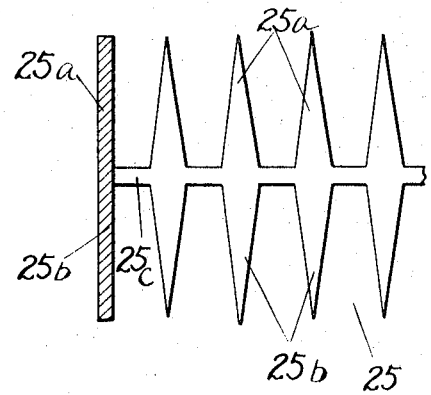
Figure 9A:
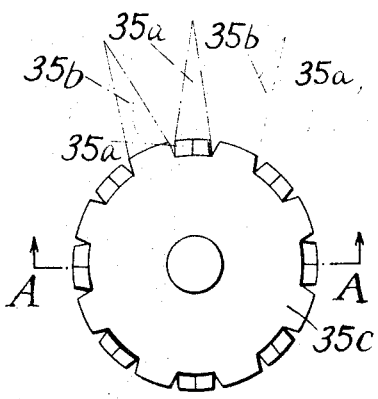

The rotor illustrated in FIGS. 7a and 7b is so constructed that pole teeth 15a and 15b extend vertically and each tapers from its midportion towards the upper and lower free ends to form sharp-pointed ends which are integrally formed into a unitary pole piece 15, the plurality of unitary pole pieces 15, 15 being secured by a screw 17 to the outer periphery of the flat disc plate 16 of nonmagnetic substance at a predetermined location. FIGS. 8a and 8b show a further example of rotor wherein a rotor formed with upper pole teeth 25a and lower pole teeth 25b having a midbeltlike portion 25c forming a boundary therebetween, is cut out of a sheet of magnetic material, both ends thereof being connected by a desired means such as welding into an endless form, and the flat disc plate 16 which is provided with a central hole 16a for receiving the rotor shaft and which is made of nonmagnetic material, is fitted into the center of the endless rotor component.

FIGS. 9a and 9b, and 10a and 10b show still further examples of rotor formation wherein magnetic pole teeth are formed in vertically alternating relation. The rotor shown in FIG. 9 is so formed that a flat disc plate 35c having a series of pole teeth 35a and 35b radially provided at an equispacing around the circumference of the plate is cut out of a sheet of magnetic material, these magnetic pole teeth 35a and 35b being bent at the circumference of flat disc plate 35c so as to extend alternately upwardly and downwardly at a right angle with respect to the plane surface 15c, thereby forming a rotor.

Figure 10A:
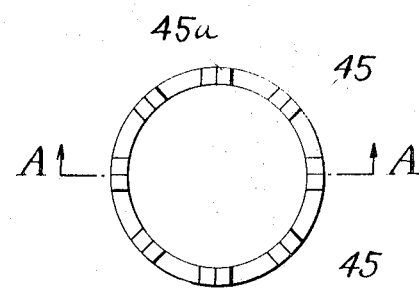
Figure 9B:
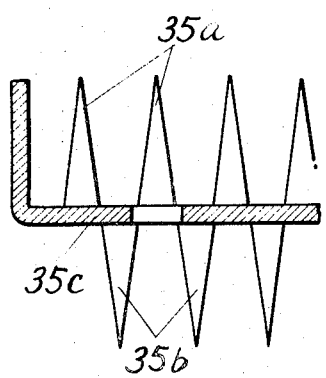
Figure 10B:
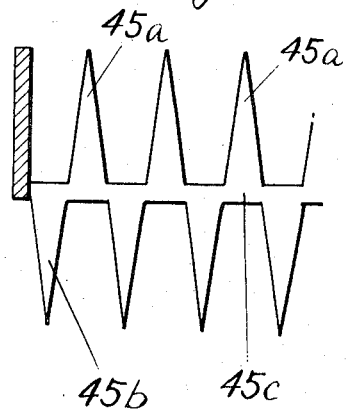

In FIGS. 10a and 10b, a rotor pattern having pole teeth 45a and 45b integrally formed to extend vertically in alternating relation from the beltlike midportion 15c is cut out of a sheet of magnetic material, both ends of said pattern being jointed by any suitable means such as welding into an endless form, and a nonmagnetic flat disc plate for carrying the rotor shaft is fitted to the central opening of the endless rotor pattern, thereby forming a rotor. Furthermore, the rotor shaft is inserted in said rotor.

The rotor used in the present invention has pole teeth vertically extending and tapered towards their free ends, so that the self-starting efficiency and torque of the motor are advantageously greatly improved.

In the conventional synchronous electric motor, the pole piece generally includes a plurality of substantially rectangular pole pieces arranged at an equiangular spacing around the circumference of the base member.

However, and as illustrated in FIG. 12a, the magnetic flux passing from these pole teeth through the gap of magnetic field is distributed in such that the AC magnetic field surrounding the permanent magnet becomes uneven. Accordingly, the magnetic lines of force tend to be largely concentrated at the portions immediately adjacent to the free ends of the rectangular striplike pole teeth, and a very small amount of magnetic lines of force extend from the portions other than the portion extremely adjacent to the free ends. As a consequence, the torque developed by the rotor pulsates, and smooth rotation of the rotor can not be obtained.

Especially in the case of a miniature synchronous electric motor having a very small moment of inertia of the rotor, the above-mentioned factors cause serious decrease in torque. Another disadvantage of pole teeth is that since the AC magnetic flux provided by the exciting coil interlinks with only a small part of the DC magnetic flux generated by the permanent magnet and the alternating magnetic flux thus interlinking is only a small portion nearer to the free ends of pole teeth, the efficiency of the motors becomes lowered because of poor utilization of the direct magnetic flux. In the other words, as illustrated in FIG. 12a, when the interlinkage zone between the direct magnetic flux and the alternating magnetic flux is increased by enlarging the distance of airgap $d$ between the base plate and the free ends of rectangular pole teeth, the resistance of the airgap in the alternating magnetic circuit increases, hence the alternating magnetic flux decreases in value. On the other hand, if the resistance of the magnetic airgap is decreased by reducing the distance of airgap, the interlinkage zone decreases. By taking these two factors into account, the distance $d$ representing the width of airgap can be selected to obtain the maximum interlinkage between the alternating magnetic flux and the direct magnetic flux.

From the results of experiments, the distance $d$ providing the maximum interlinkage is determined to be from one-fifth to one-fourth of the height or length of the permanent magnet. This will tell that the magnetic flux actually available to exert a torque in said synchronous electric motor is only a small part of the entire magnetic flux of permanent magnet.

In the synchronous electric motor of the present invention, since pole teeth, of which the width is reduced toward their free ends into a tapered form, are used, the magnetic resistance increases towards these free ends. The interlinking magnetic lines of force are provided not only at the free ends of pole teeth but also at the base portions thereof. All of the pole teeth are alternately magnetized to the same instantaneous polarity, the north pole or the south, by the exciting coil 2.

Thus, the alternating magnetic flux becomes an interlinkage flux distributed uniformly over the entire cylindrical surfaces of permanent magnets 11, 11, owing to the fact that the magnetic lines of force extend not only from the portions adjacent to the free ends of respective pole teeth but also from the entire edge surfaces thereof.

By virtue of this uniform distribution, the alternating magnetic flux can efficiently interlink with the direct magnetic flux at a high efficiency, provided that the magnetic pole piece is made of any material having a sharp magnetic saturation characteristic, and has a proper thickness, shape and dimension. The moment of inertia of the rotor is greatly deceased by reducing the entire mass of the rotor with its pole teeth 12', 12' tapering towards their free ends, so that the self-starting and the rotational efficiency of the motor of the present invention are greatly improved. The breaks or cutouts 12'' between adjacent pole teeth 12', 12' of the rotor serve to decrease eddy current which might be provided in the rotor.

In the synchronous motor in accordance with the present invention, since salient pole rings 4a and 6a are arranged to confront the upper pole teeth 12' and the lower pole teeth 12' within the alternating magnetic circuit, the interlinkage of the alternating magnetic field from the exciting coil 2 with the direct magnetic field from the permanent magnet becomes increased.

By contrast, in the conventional synchronous electric motor which does not include salient pole rings confronting the free ends of pole teeth, the distribution of the alternating magnetic flux on both sides of a pole tooth in the alternating magnetic circuit is such that the density of magnetic flux in the axial section along the shaft is decreased, and the amount of alternating magnetic flux interlinking with the direct magnetic field is reduced. This is due to the fact, as shown in FIG. 12b, that the magnetic lines of force leak from the free ends of pole teeth 12'. On the contrary, in the synchronous electric motor of the present invention, as fully illustrated in FIG. 11, the alternating magnetic flux leaking from the pole tooth 12' is concentrated into the gap formed between the pole tooth and the salient pole ring 6a to increase the density of magnetic flux, thereby greatly improving the torque and motor efficiency. This advantageously results in making the alternating magnetic field from the exciting coil 2 more efficient, thereby increasing its interlinkage with the direct magnetic field from the permanent magnet 11.

Figure 2:
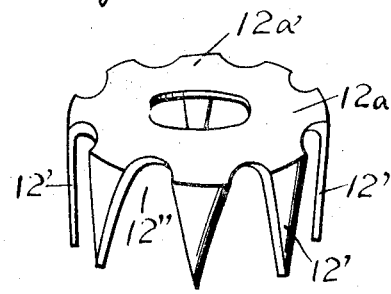
FIG. 2 is a perspective view of a rotor forming part or rotor component.

The following table shows the characteristics of two types of rotors, one of them A being a rotor the pole teeth of which extend in only one direction, upwardly or downwardly as seen in FIG. 2, and the other B being a rotor the pole teeth of which extend vertically in the two opposite directions.

|  | Current to be supplied to the exciting coil, ma. | Torque, kg./cm. | Weight of rotor, g. |
| --- | --- | --- | --- |
| (A) A rotor having pole teeth extending in only one direction | 22.1 | 7.0 | 6 |
| (B) A rotor of the present invention with pole teeth extending vertically in the opposite directions | 23.6 | 15.0 | 14 |

As will be apparent from the above table, although, in either rotor A or B, substantially the same amount of current is supplied to the exciting coil, the obtained torques in the rotors A and B are respectively 7.0 and 15.0, that is to say, the torque in the rotor B is twice larger than that in the rotor A. In the rotor of the present invention, twice the torque is obtained, in comparison with the conventional rotor, with the same ampere-turns of exciting coil.

The present invention, therefore, can advantageously provide a synchronous electric motor which comprises a pair of cylindrical permanent magnets fixedly mounted at a desired spacing with their opening ends facing each other within a motor casing, an annular AC exciting coil arranged coaxially around these permanent magnets, and a rotor interposed between said pair of cylindrical permanent magnets and having upper pole teeth and lower pole teeth extending vertically at the desired spacings around a circumferential edge of a flat disc plate to the center of which a rotor shaft is fitted, said upper and lower pole teeth of the rotor lying within a magnetic airgap which is formed by said pair of cylindrical permanent magnets and exciting coil. Hence the upper pole teeth and the lower pole teeth are caused to efficiently interlink with the direct magnetic flux and the alternating magnetic flux, thereby improving the self-starting efficiency, and thus working reliability is obtained.

I claim:

1. A miniature synchronous electric motor comprising a pair of cylindrical permanent magnets fixedly mounted coaxially at a desired distance from each other within a motor casing and having their open ends facing each other, an annular AC exciting coil arranged coaxially around the outer periphery of these permanent magnets, and a rotor interposed between said pair of cylindrical permanent magnets and provided with circumferentially spaced upper pole teeth and lower pole teeth extending around the circumference of a flat disc plate, and a rotor shaft fitted to the center of said disc plate, said upper and lower pole teeth lying radially within the magnetic airgap formed by said permanent magnets and exciting coil.

2. A miniature synchronous electric motor as claimed in claim 1, in which the upper and lower pole teeth are vertically in aligned relation with their free ends extending in opposite directions, and the circumferential poles of the pair of permanent magnets are vertically opposite, the north pole of one permanent magnet lying on its circumference opposite to and above the south pole of the other permanent magnet.

3. A miniature synchronous electric motor as claimed in claim 1, in which the upper and lower pole teeth are in the vertically alternating relation, and the pair of permanent magnets are so arranged as to have the same polarity at their opposite circumferences, which alternately locates the north pole with the south pole in alignment.